(12) United States Patent
Jain

(10) Patent No.: US 9,742,800 B2
(45) Date of Patent: *Aug. 22, 2017

(54) SYSTEM AND METHOD FOR SOFTWARE DEFINED BEHAVIORAL DDOS ATTACK MITIGATION

(71) Applicant: Fortinet, Inc., Sunnyvale, CA (US)

(72) Inventor: Hemant Kumar Jain, Milpitas, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,490

(22) Filed: Dec. 31, 2016

(65) Prior Publication Data

US 2017/0149822 A1    May 25, 2017

Related U.S. Application Data

(63) Continuation of application No. 14/042,860, filed on Oct. 1, 2013, now Pat. No. 9,602,535.

(51) Int. Cl.
*G06F 17/00* (2006.01)
*H04L 29/06* (2006.01)

(52) U.S. Cl.
CPC ...... *H04L 63/1458* (2013.01); *H04L 63/1416* (2013.01); *H04L 63/1425* (2013.01); *H04L 63/20* (2013.01)

(58) Field of Classification Search
CPC ............................. H04L 63/20; H04L 63/1458
USPC ................................... 726/22–25, 1; 713/188
See application file for complete search history.

(56) References Cited

U.S. PATENT DOCUMENTS

| 7,426,634 | B2 | 9/2008 | Jain |
| 8,607,346 | B1 | 12/2013 | Hedge et al. |
| 8,615,785 | B2 | 12/2013 | Elrod et al. |
| 2004/0205360 | A1 | 10/2004 | Norton et al. |
| 2006/0018478 | A1 | 1/2006 | Diefenderfer et al. |
| 2006/0146816 | A1 | 7/2006 | Jain |
| 2006/0236402 | A1 | 10/2006 | Russell et al. |
| 2010/0082513 | A1 | 4/2010 | Liu |
| 2011/0138463 | A1 | 6/2011 | Kim et al. |
| 2012/0054823 | A1 | 3/2012 | Kim |
| 2012/0216282 | A1 | 8/2012 | Pappu et al. |

(Continued)

OTHER PUBLICATIONS

Non-Final Rejection for U.S. Appl. No. 14/042,860 mailed May 27, 2015.

(Continued)

*Primary Examiner* — Mohammed Waliullah
(74) *Attorney, Agent, or Firm* — Hamilton, DeSanctis & Cha LLP

(57) ABSTRACT

Systems and methods for software defined behavioral DDoS attack mitigation are provided. According to one embodiment, a method is provided for mitigating DDoS attacks. A DDoS attack mitigation appliance of multiple mitigation appliances controlled by a DDoS attack mitigation central controller receives DDoS attack mitigation policies through a network connecting the controller and the mitigation appliance. A DDoS attack is mitigated by the mitigation appliance based on the received mitigation policies. The mitigation policies are generated by the controller based on granular behavioral packet rate thresholds estimated based on granular traffic rate information collected from one or more of the multiple mitigation appliances controlled by the controller.

18 Claims, 8 Drawing Sheets

(56) References Cited

U.S. PATENT DOCUMENTS

| | | |
|---|---|---|
| 2014/0233385 A1 | 8/2014 | Beliveau et al. |
| 2014/0269728 A1 | 9/2014 | Jalan et al. |
| 2015/0095969 A1 | 4/2015 | Jain |
| 2017/0111397 A1 | 4/2017 | Jain |

OTHER PUBLICATIONS

Final Rejection for U.S. Appl. No. 14/042,860 mailed Nov. 17, 2015.
Non-Final Rejection for U.S. Appl. No. 14/042,860 mailed Apr. 20, 2016.
Notice of Allowance for U.S. Appl. No. 14/042,860 mailed Dec. 19, 2016.
Notice of Allowance for U.S. Appl. No. 15/396,470 mailed Apr. 28, 2017.

SYSTEM AND METHOD FOR SOFTWARE DEFINED BEHAVIORAL DDOS ATTACK MITIGATION

CROSS-REFERENCE TO RELATED PATENTS

This application is a continuation of U.S. patent application Ser. No. 14/042,860, filed on Oct. 1, 2013, which is hereby incorporated by reference in its entirety for all purposes.

This application also relates to U.S. Pat. No. 7,426,634 entitled, "Method and apparatus for rate based denial of service attack detection and prevention", U.S. Pat. No. 7,602,731 entitled "System and method for integrated header, state, rate and content anomaly prevention with policy enforcement", and U.S. Pat. No. 7,626,940 entitled "System and method for integrated header, state, rate and content anomaly prevention for domain name service" all of which are hereby incorporated by reference in their entirety for all purposes. This application is also related to U.S. patent application Ser. No. 13/943,085, filed Jul. 16, 2013, entitled "Scalable inline behavioral DDoS attack mitigation," which is also hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2016, Fortinet, Inc.

FIELD

Embodiments of the present invention relate generally to software defined networking (SDN) for distributed denial of service (DDoS) attacks.

DESCRIPTION OF THE BACKGROUND ART

Networks have been growing in complexity over the years. A typical data center network or an Internet Service Provider (ISP) network is extremely complex to design and manage with potentially numerous appliances deployed for management and security of such a network.

Network attacks have been simultaneously growing in complexity and size over the years. Among them, Distributed Denial of Service (DDoS) attacks are especially difficult to mitigate. DDoS attacks are primarily blocked using behavioral algorithms. This requires that the appliances that understand the behavior of the protected entity remain close to it.

While the inline appliances must remain close to protected entity, the complexity and size of the storage required for behavior data and management policies increase and may be remote from central control. When the number of mitigation appliances approaches the hundreds, thousands or even more, the associated complexity may increase linearly in relation to the number of mitigation appliances.

An innovative approach is required to facilitate decoupling and separation of the data plane, i.e., task of behavior collection and attack mitigation using specialized DDoS attack mitigation components from the control plane, i.e., the storage of behavioral data and attack mitigation policy creation. This will allow the behavioral data and policies to be centrally stored and controlled while data collection, attack mitigation and packet forwarding processing remains in close proximity to the protected entity.

SUMMARY

Innovative methods and systems are described for an integrated solution to the distributed denial of service attacks mitigation for a large network including multiple protected entities. According to one embodiment, a method is provided for mitigating distributed denial of service (DDoS) attacks. A DDoS attack mitigation appliance of multiple DDoS attack mitigation appliances controlled by a DDoS attack mitigation central controller receives DDoS attack mitigation policies through a network connecting the DDoS attack mitigation central controller and the DDoS attack mitigation appliance. A DDoS attack is mitigated by the DDoS attack mitigation appliance based on the received DDoS attack mitigation policies. The DDoS attack mitigation policies are generated by the DDoS attack mitigation central controller based on granular behavioral packet rate thresholds estimated based on granular traffic rate information collected from one or more of the DDoS attack mitigation appliances.

Other features of embodiments of the present disclosure will be apparent from accompanying drawings and from detailed description that follows.

DETAILED DESCRIPTION

Figure 1:
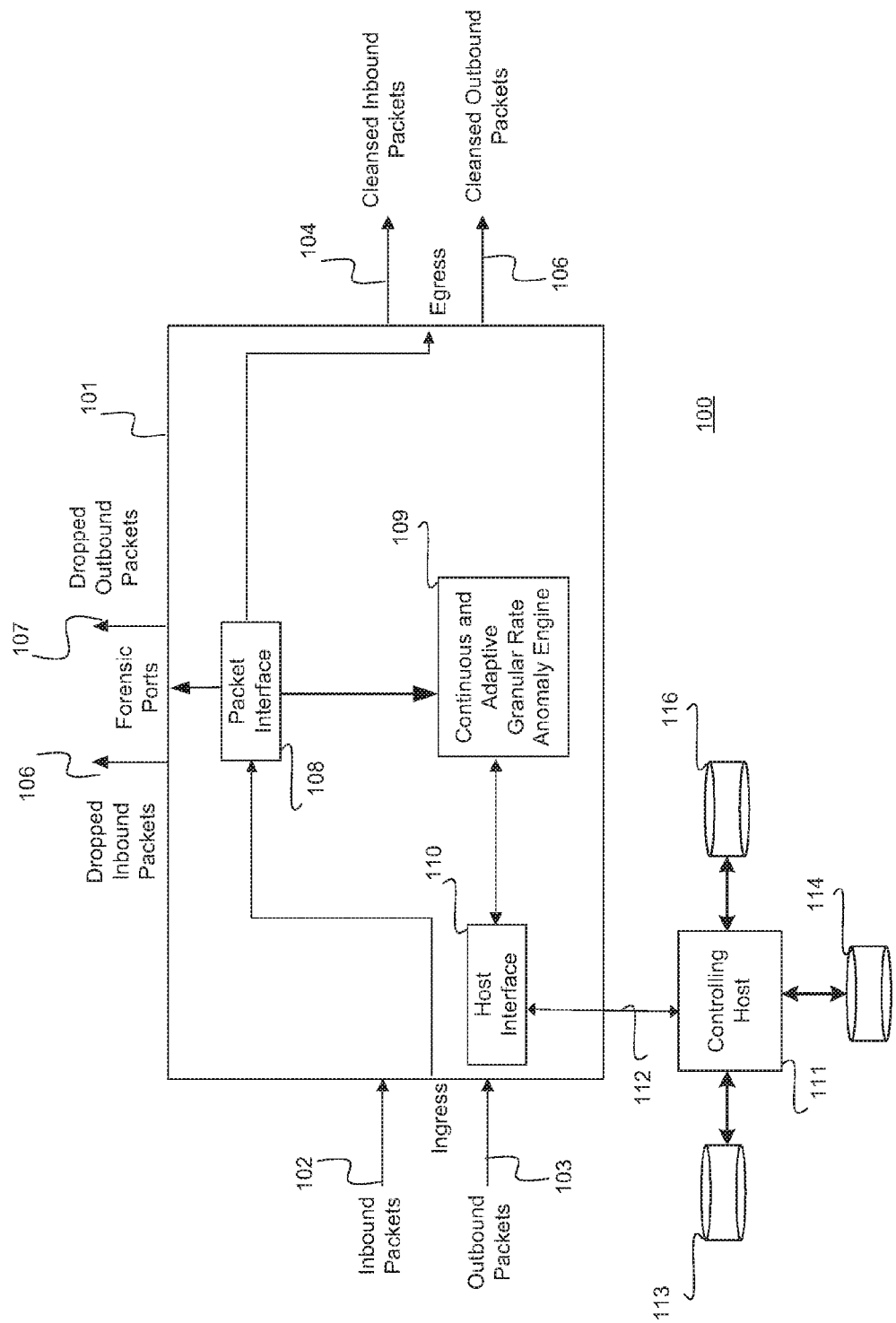
FIG. 1 illustrates an exemplary inline DDoS attack mitigation apparatus known in the art. Such exemplary apparatus combines the behavior learning, attack mitigation, management and reporting in one appliance which makes this apparatus bulky. The control and data plane are together in this appliance.

An integrated solution is described for mitigation of Distributed Denial of Service (DDoS) attacks on a network with multiple protected entities, such as an Internet Service Provider (ISP) network, a data center network or individual Internet-facing servers. According to one embodiment, the storage of behavioral data, adaptive and continuous estimation of behavioral thresholds based on past traffic is centralized in a DDoS attack mitigation central controller. Policies that are managed by the controller and controlling the decentralized mitigation components are also centralized in embodiments of the present invention. The DDoS attack mitigation central controller is part of the control plane of the integrated system.

In one embodiment, a controller which communicates with and controls multiple DDoS attack mitigation appliances is provided. Components of the controller and the appliances are described so that they can securely communicate with each other and provide mitigation capability to a large network that needs to be protected from such attacks. The system can be scaled up by increasing the number of the distributed appliances and the capacity of the central controller.

Embodiments of the present invention also include a specialized but operationally simple data collection and mitigation appliance that interacts with a centralized storage and policy component. These decentralized appliances are part of the data plane of the integrated system.

Embodiments of the present invention provide a solution that separates the control and data plane for the DDoS attack mitigation and thereby provides a software defined solution. Separating the control plane (into the DDoS attack mitigation central controller) and data plane (the decentralized mitigation appliances) leads to many benefits which will be apparent later. One benefit of the innovative approach described herein is that the two technologies (i.e., the data plane and control plane functionality) can be decoupled, grow independently and remain state of the art. In an exemplary embodiment of this invention, the data plane may be implemented in highly specialized hardware logic using an Application-Specific Integrated Circuit (ASIC) or Field-Programmable Gate Arrays (FPGAs) while the control plane may use the latest techniques in the software domain. In one embodiment, a single software based controller controls multiple attack mitigation appliances via a network.

The size of DDoS attacks on Internet data center networks have been growing as more services move to large data centers in the cloud. One obvious solution which is the state of the art is to protect individual servers or networks with individual appliances based on their behavioral characteristics.

Embodiments of the new solution described herein provide a distributed architecture in which there is a DDoS attack mitigation central controller and multiple minimalistic DDoS attack mitigation appliances.

The DDoS attack mitigation appliances specialize in the data path, i.e., packet forwarding and attack mitigation per policies and collection of packet rate statistics and enforcement of behavioral thresholds. Since packet forwarding and policy enforcement based on behavioral thresholds and other characteristics can be implemented in commodity hardware, in a preferred embodiment of this solution, the minimalistic DDoS appliances may be implemented using hardware components such as FPGAs or an ASIC.

The DDoS attack mitigation central controller on the other hand specializes in the control path, i.e., centralized data collection, threshold estimation and communication of these thresholds and collection of attack statistics. These are software centric activities and can be improved as software technology improves.

Within the data plane, the DDoS attack mitigation appliance may provide copper/fiber connectivity. The appliance decides whether to drop or to allow incoming packets based on behavioral policies set by the DDoS attack mitigation central controller. The appliance determines the granular rates and is programmed to set the granular behavioral thresholds by the central controller. The appliance also collects the mitigation statistics and dispatches them to the controller for eventual display to the end user or the administrator of the controller. The appliance also provides other controls, such as access control lists, geo-location control, etc., which are well known to those of ordinary skill in the art. In one embodiment, the DDoS attack mitigation appliance supports virtualization so that a single appliance can provide distinct policies for multiple networks.

Within the control plane, the controller collects the granular rates from a plurality of DDoS attack mitigation appliances. These rates are then used to derive the granular adaptive thresholds to be sent back to the individual appliances for enforcement. The controller also collects mitigation statistics from the appliances for eventual display to the end user or the administrator of the controller.

An object of various embodiments of the present invention is to provide a hardware based distributed system and method of mitigating DDoS attacks, the packets having layers 2, 3, 4, and 7 rate anomalies as detected by the host computer within the apparatus, which is continuously and adaptively adjusting granular layer 2, 3, 4 and 7 rate thresholds based on past base rate, trends and seasonality;

A further object of various embodiments of the present invention is to provide a central software controller consisting of rate anomaly engine capable of continuously calculating the traffic rate on classified parameters and estimating the traffic rate thresholds adaptively and thus determining the thresholds for a plurality of DDoS attack mitigation appliances. This is subsequently used to determine the granular adaptive rate thresholds to be set on the appliances.

FIG. 1 depicts an exemplary apparatus illustrating the functionality of a single DDoS attack mitigation appliance 100 for the mitigation of DDoS attacks in accordance with the state of the art. This component is treated as a black-box with a Host Interface being controlled by controlling host 111.

Inbound packets 102 enter the component 101 and exit as cleansed inbound packets 104. Similarly, outbound packets 103 enter the component 101 and exit as cleansed outbound packets 105. The dropped packets make the difference between packets at ingress and at egress. For the purpose of forensic analysis, these dropped packets may be routed to two forensic ports viz. the dropped inbound packets 106, and the dropped outbound packets 107.

A controlling host 111, such as a management Central Processing Unit (CPU), uses a host interface 108 to read the controlling parameters and set the parameters of different blocks via host interface 108 using a bus 109, such as a Peripheral Component Interconnect Express (PCIe) bus. Controlling host 111 also periodically reads the granular traffic rates and uses it to estimate threshold for rate parameters. Controlling host 111 also reads the mitigation statistics. In some embodiments, these events are subsequently logged and/or analyzed. In an exemplary embodiment, controlling host 111 can read the maximum packet rates for Transmission Control Protocol (TCP) SYN packets in two directions and set the adaptive thresholds for them through host interface 108. In another exemplary embodiment, controlling host 111 can read the maximum count of concurrent connections per source in two directions and set the adaptive thresholds for them through host interface 108.

Figure 2:
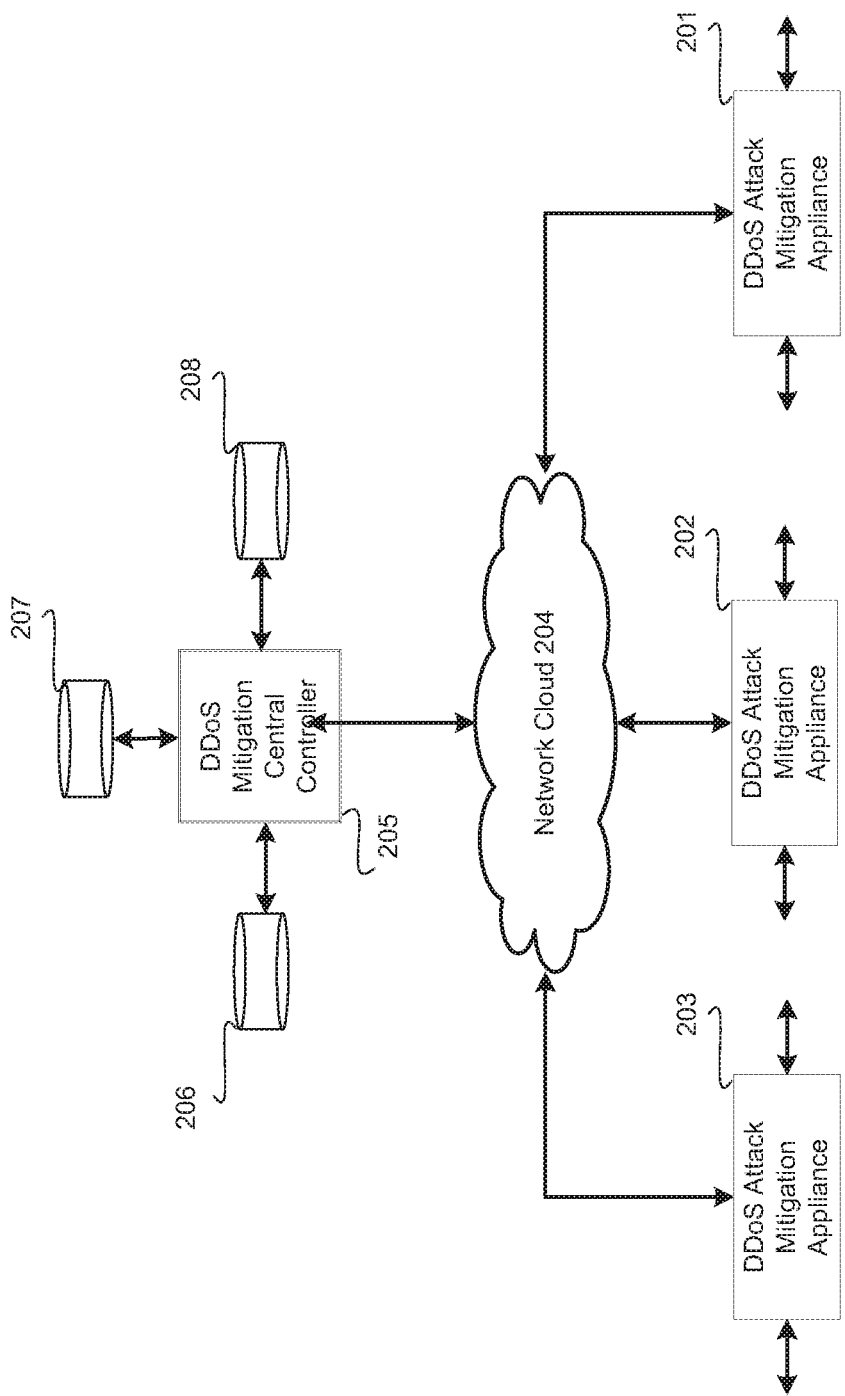
FIG. 2 schematically shows an exemplary deployment according to this invention where the control and data plane have been separated.

FIG. 2 schematically shows an exemplary deployment according to this invention where the control and data plane have been separated. In the context of the present example, DDoS attack mitigation central controller 205 is responsible for the control plane where as the individual appliances 201, 202, and 203 manage the data plane and process the packets for DDoS attack mitigation.

Each appliance 201, 202 and 203 is in the path of packets and protecting some network from DDoS attacks. The purpose of these appliances is to collect behavioral statistics and forward to the DDoS attack mitigation central controller 205 and get the behavioral policies from there and enforce them while packet forwarding.

The DDoS attack mitigation system shown in FIG. 2 consists of a central controller 205 that receives behavioral data from appliances such as 201, 202, and 203 and stores the behavioral data in database 206. This data is used to predict behavioral thresholds which are combined with user defined mitigation policies that are stored in database 207 and then sent to individual appliances to enforce. The attack statistics received from appliances is stored in database 208 and are available to be displayed to the administrator for analysis.

Figure 3:
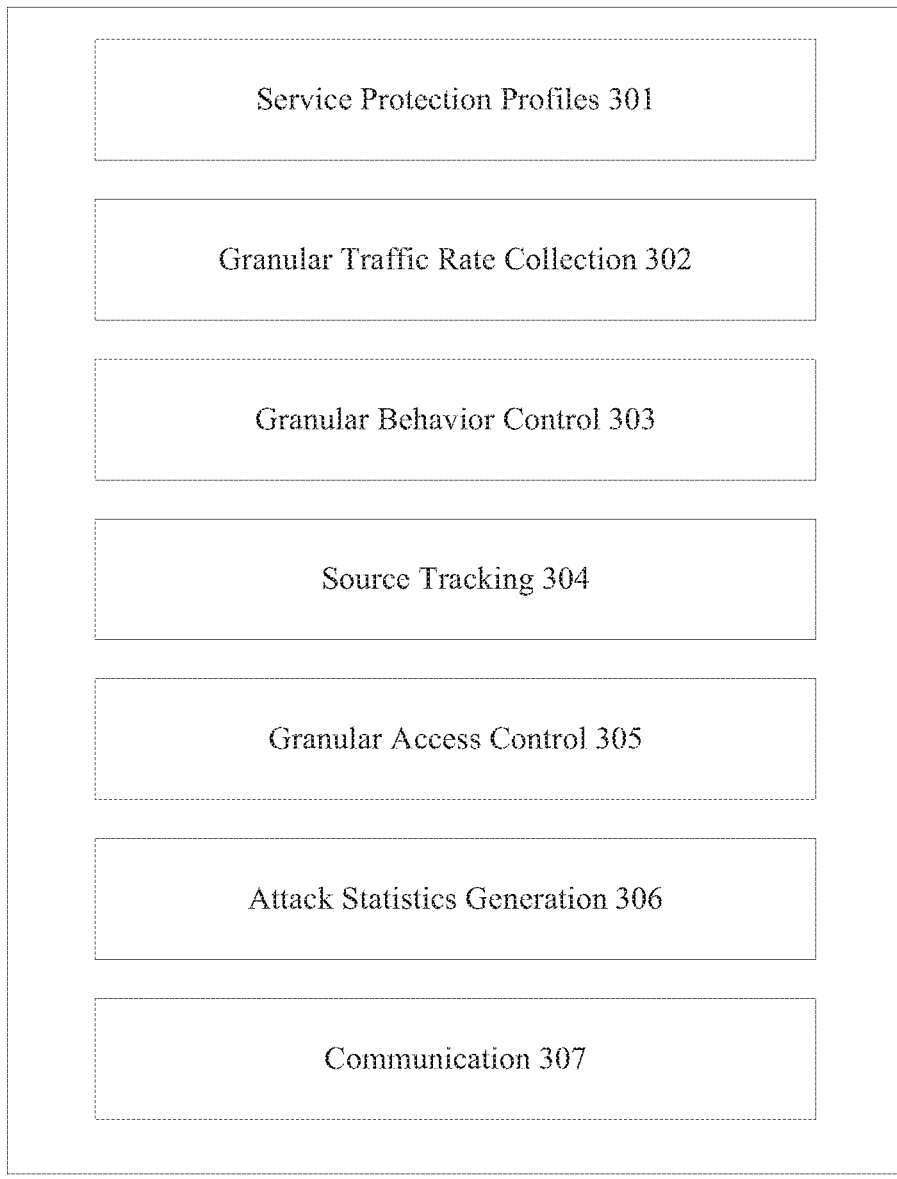
FIG. 3 illustrates exemplary data plane components within the decentralized DDoS attack mitigation appliances in accordance with an embodiment of the present invention.

FIG. 3 illustrates the functional components of the DDoS attack mitigation appliances such as 201, 202 and 203 according to one embodiment of the present invention.

In an exemplary embodiment of this invention, these functional components can be implemented in hardware logic, such as in ASIC or FPGA, and made into commodity components.

One of the functions of the appliance is to expose service protection profiles 301. The purpose of this component is to enforce different policies on different virtual networks within the protected networks. In exemplary embodiment of this invention, the virtualization itself can be implemented using IP address/masks, Virtual Local Area Network (VLAN) tags, Media Access Control (MAC) addresses etc. The purpose is to have independent policies for each of the protected profiles. This helps brings down the cost of the mitigation, as a single appliance can protect multiple policies independently.

The next function of the appliance is granular traffic rate Collection 302. The purpose of this component is to collect granular traffic rates for different protected profiles. Granularity here means layer 2, 3, 4 and 7 of the network stack. In an exemplary embodiment of this invention, layer 2 rate collection includes rates for broadcast, multicast, Address Resolution Protocol (ARP), Reverse ARP (RAPR), VLAN tagged packets, Internet Protocol (IP) packets, non-IP packets etc. In an exemplary embodiment of this invention, layer 3 rate collection includes rates for multiple IP protocols, fragmented packets, various Type of Service/Differentiated Services (TOS/DS) values, etc. In an exemplary embodiment of this invention, layer 4 rate collection includes rates for one or more of TCP, User Datagram Protocol (UDP) ports, Internet Control Message Protocol (ICMP) types/codes, SYN packets, TCP connection establishment rates values, etc. In an exemplary embodiment of this invention, layer 7 rate collection includes rates for one or more layer 7 parameters for HyperText Transfer Protocol (HTTP), Session Initiation Protocol (SIP), Domain Name System (DNS) and other layer 7 protocols etc. These parameters are well understood in the state of the art and hence have not been described in detail here.

Yet another function of the appliance is granular behavior control 303. The purpose of this component is to enforce rate based policies at granular levels within each protected profile. When the central controller 205 sets these policies in individual appliance, this component enforces those policies. Traffic rates are controlled within these granular limits. In an exemplary embodiment of this invention, these rates are typically in per second basis, e.g. SYN packets/second, HTTP GET operations/second etc.

Another exemplary function of the appliance is source tracking 304. When the same source breaches same behavioral rate thresholds again and again, the offending unique source must be isolated and punished for a longer period.

According to an embodiment of this invention, yet another exemplary function of the appliance is granular access control 305. These are well understood ways to block sources, destinations, protocols, ports, Uniform Resource Locators (URLs), domains, geo-locations, etc.

Another exemplary function of the appliance is attack statistics generation 306. When the attack packets are dropped due to attack mitigation policies or due to access control policies, these details are generated and centrally collected by the controller for report to the administrators.

Since the appliances have to communicate with the controller over a secure communication link, a communication component 307 is required. This ensures authenticated and encrypted communication between the appliance and the controller.

Figure 4:
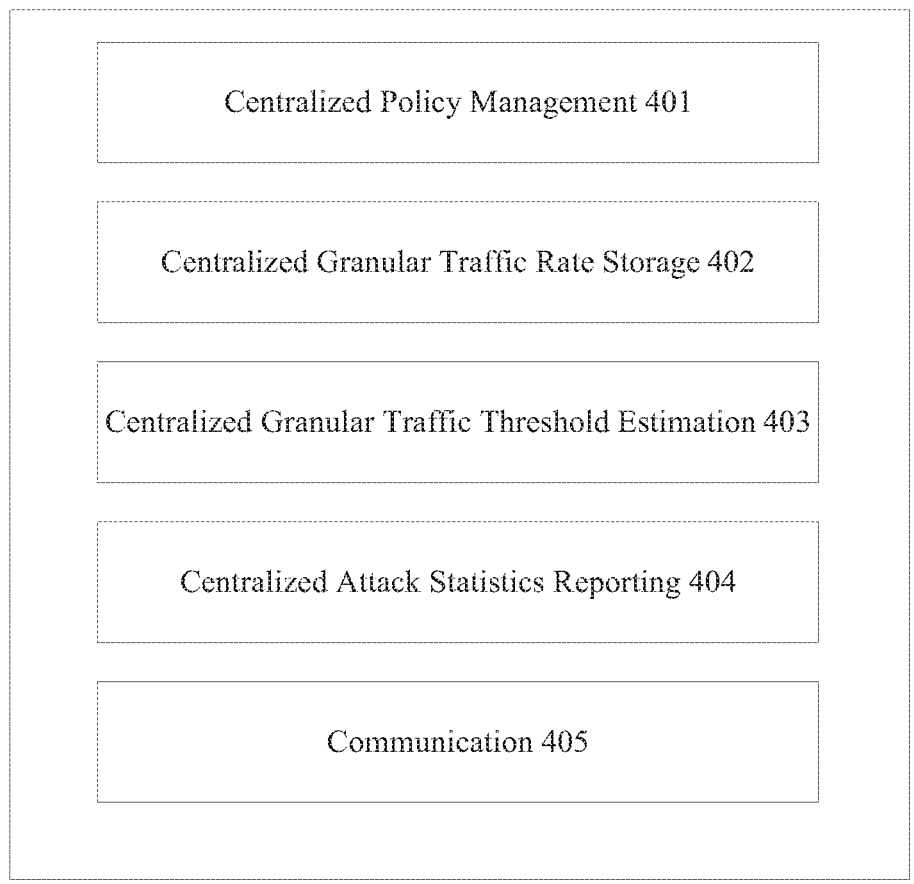
FIG. 4 illustrates exemplary control plane components within the DDoS attack mitigation central controller in accordance with an embodiment of the present invention.

FIG. 4 illustrates the functional components of the central controller 205 according to an embodiment of the present invention.

In an exemplary embodiment of this invention, these functional components are typically implemented in software and can be enhanced over time.

According to an embodiment of this invention, one of the functions of the central controller is centralized policy management 401. The purpose of this component is to manage and store different policies on different virtual networks within the protected networks for a plurality of the DDoS attack mitigation appliances. The central controller may also manage such policies in a store.

According to an embodiment of this invention, another function of the central controller is centralized granular traffic rate storage 402. As each distributed DDoS attack mitigation appliance collects the granular rates, it sends it to the central controller over a secure communication channel. The central controller stores these in database 206.

According to an embodiment of this invention, yet another function of the appliance is centralized granular traffic rate estimation 403. The collected granular rates in the storage are used to estimate the adaptive granular rate thresholds. These adaptive thresholds are calculated based on well known techniques in the art for traffic forecasting, such as Holtz Winter exponential smoothing. The traffic forecasts are combined with user defined policies to come up with actual granular behavior thresholds to be communicated to the appliances.

Yet another function of the central controller is centralized attack statistics reporting 404. The collected granular drop rates the distributed DDoS attack mitigation appliances are stored in database 208. This statistics are available to be displayed to a plurality of administrator of different service protection profiles based on their authentication and authorization.

Since the central controller has to communicate with the distributed DDoS attack mitigation appliances over a secure communication link; a communication component 405 is required. This ensures authenticated and encrypted communication between the appliance and the central controller.

Removable storage media may be attached to the host to provide and store statistics and policies. This can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Figure 5A:
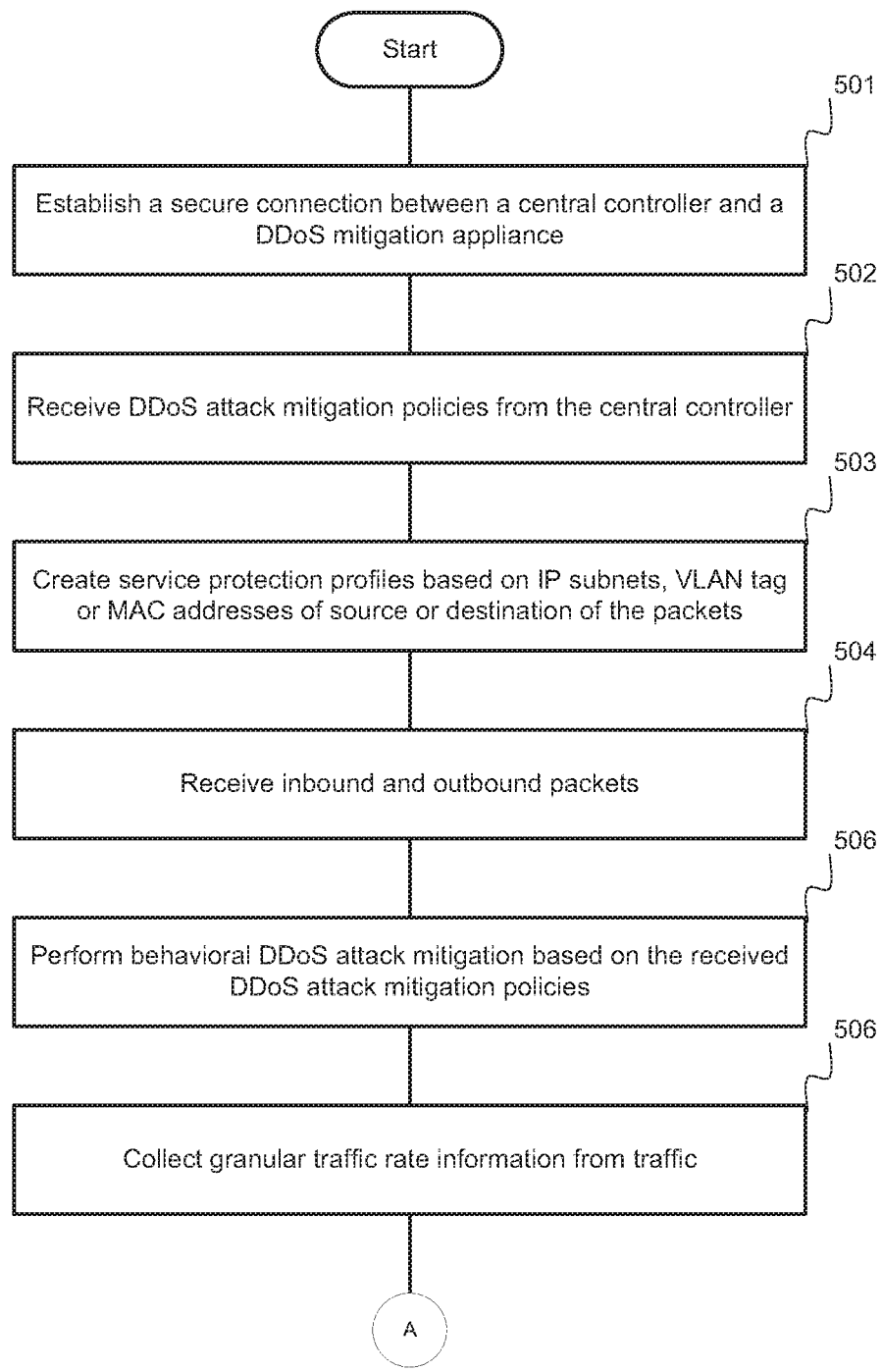
FIGS. 5A and 5B are flow charts illustrating a process of mitigating DDoS attack by a data plane component in accordance with an embodiment of the present invention.
Figure 5B:
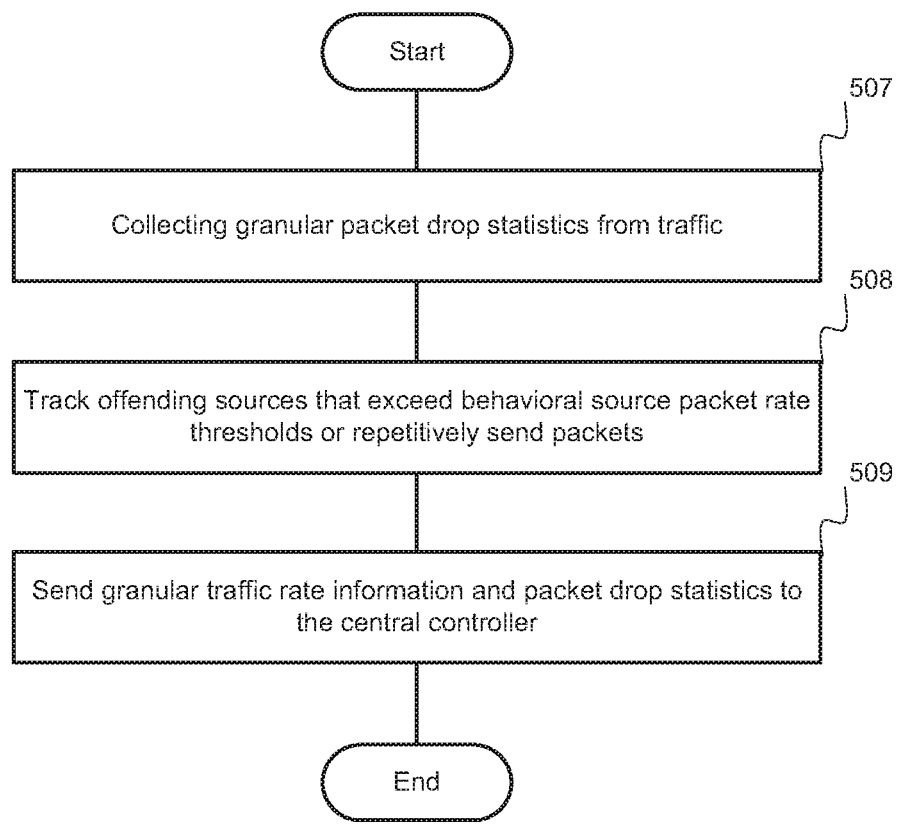

FIGS. 5A and 5B are flow charts illustrating a process of mitigating DDoS attack by a data plane component in accordance with an embodiment of the present invention. In the context of the present example, the data plane component is a minimalistic DDoS attack mitigation appliance that remains in close proximity to a protected entity but the management of mitigation policies is moved to a remote central controller. The central controller and the DDoS attack mitigation appliances are connected through a private or public network. As the control information is transferred through the network, it would be better to setup a secure connection before any data is transferred. Therefore, at block 501, the DDoS attack mitigation appliance is authenticated with the central controller and a secure connection is setup so that encrypted data may be transferred between the two devices.

At block 502, the DDoS attack mitigation appliance receives mitigation policies from the central controller through the secure connection. The mitigation policies are configured by the administrator of the central controller and may be adjusted based on the granular traffic rate information feedback to the central controller by DDoS attack mitigation appliances. The mitigation policies may include granular behavioral packet rate thresholds and operations that a DDoS attack mitigation appliance may conduct when a DDoS attack is detected.

At block 503, the DDoS attack mitigation appliance may create service protection profiles based on IP subnets, VLAN tags or MAC addresses of source or destination of the packets. In this embodiment, the DDoS attack mitigation appliance is used for protecting multiple entities, such as multiple computers or multiple VLANs. The DDoS attack mitigation appliance may be virtualized as multiple virtual appliances so that each of the protected entities may have a service protection profile and the virtual appliance may enforce different policies on different protected entities based on the profiles. Mitigation policies for respective entities may be stored in the service protection profiles of the respective entities.

At block 504, the DDoS attack mitigation appliance receives inbound and outbound packets. The DDoS attack mitigation appliance is in the path of packets and the packets are intercepted by the DDoS attack mitigation appliance before they are actually sent in or out of the network.

At block 505, after the packets are received, the DDoS attack mitigation appliance conducts behavioral DDos attack mitigation based on the DDoS attack mitigation policies received from the central controller. The DDoS attack mitigation appliance may check the packet rates and the rate thresholds set in the policies. If a packet rate is over the threshold, the DDoS attack mitigation appliance may conduct the operation defined in the policies, such as drop the packets or block a source for a certain time.

At block 506, the DDoS attack mitigation appliance may collect granular traffic rate information from the packet traffic. As the mitigation policies may be adjusted dynamically by the central controller based on the packet traffic rate, the DDoS attack mitigation appliance may collect the granular traffic rate and other traffic information and then, send the traffic information to the central controller.

At block 507, the DDoS attack mitigation appliance may collect granular packet drop statistics so that the administrator of the DDoS attack mitigation system may be informed of the statuses of DDoS attacks.

At block 508, the DDoS attack mitigation appliance may further track offending sources that exceed behavioral source packet rate thresholds or repetitively send packets. By tracking the sources of DDoS attacks, the offending unique source may be isolated and punished for a longer period based on the mitigation policies.

At block 509, the DDoS attack mitigation appliance may send the granular traffic information, packet drop statistics and/or offending sources to the central controller so that the controller may adjust the mitigation policies accordingly.

Figure 6A:
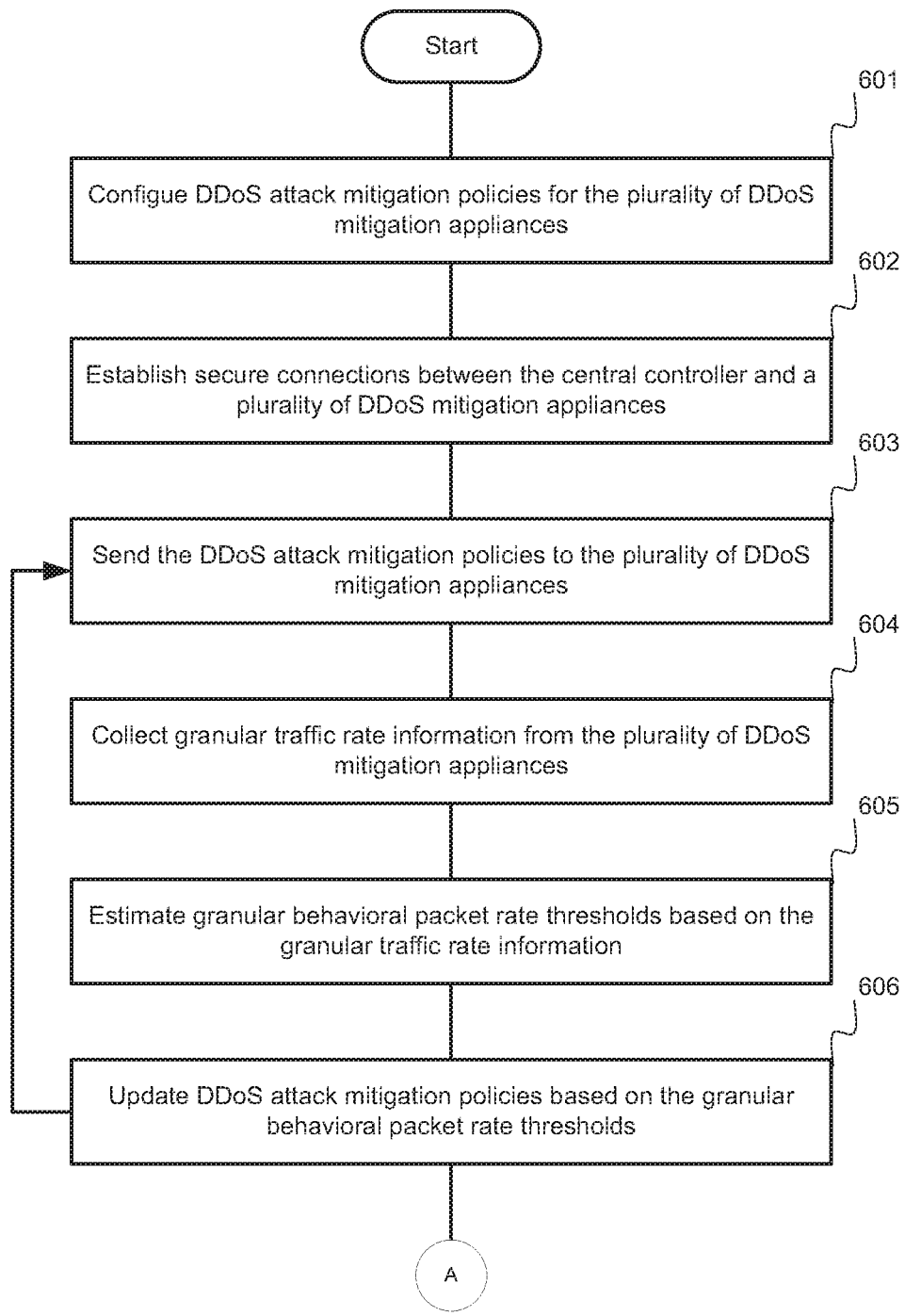
FIGS. 6A and 6B are flow charts illustrating a process of controlling DDoS attack mitigation appliances by a control plane component in accordance with an embodiment of the present invention.
Figure 6B:
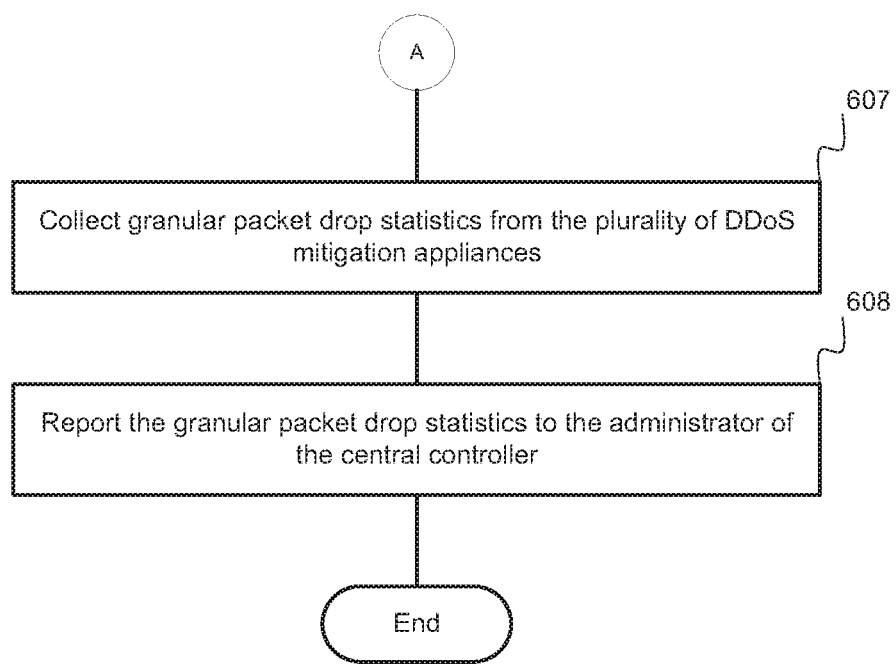

FIGS. 6A and 6B are flow charts illustrating a process of controlling DDoS attack mitigation appliances by a control plane component in accordance with an embodiment of the present invention. In this embodiment, a DDoS attack mitigation central controller is used for controlling multiple minimalistic DDoS attack mitigation appliances so that the mitigation policies and other controlling functions, such as logging, reporting, configuration or updating of the DDoS attack mitigation appliances may be managed in a central device.

At block 601, the administrator of a DDoS attack mitigation central controller may configure mitigation policies for multiple DDoS attack mitigation appliances controlled by the central controller. These mitigation policies may include granular behavioral packet rate thresholds and operations that a DDoS attack mitigation appliance may conduct when DDoS attacks are detected. These mitigation policies may be stored in a database or a media attached to the controller.

At block 602, one or more DDoS attack mitigation appliances are authenticated with the central controller and secure connection(s) is/are setup between the central controller and the DDoS attack mitigation appliance(s) so that encrypted data may be transferred.

At block 603, the central controller sends mitigation policies to one or more DDoS attack mitigation appliances through the secure connection. The DDoS attack mitigation appliances, as executing units of the mitigation system, conduct DDoS attack mitigation based on the received policies and feedback traffic information and drop statistics.

At block 604, the central controller receives granular traffic rate information from DDoS attack mitigation appliances. The granular traffic rate information is collected by the DDoS attack mitigation appliances in real time and feedback to the central controller so that the controller may adjust mitigation accordingly. It will be appreciated by a person having ordinary skill in the art that other traffic information and/or offending sources collected by DDoS attack mitigation appliances may also be received by the central controller.

At block 605, the central controller estimates granular behavioral packet rate thresholds based on the granular traffic rate information and/or other information feedback by DDoS attack mitigation appliances.

At block 606, the central controller update mitigation policies based on the granular behavioral packet rate thresholds and the updated mitigation policies may be transferred to one or more DDoS attack mitigation appliances so that the DDoS attack mitigation appliances may adjust DDoS attack mitigation based on the updated policies.

At block 607, the central controller receives granular packet drop statistics from one or more DDoS attack mitigation appliances. The granular packet drop statistics and other operation information are collected by the DDoS attack mitigation appliances in real time and feedback to the central controller.

At block 608, the central controller reports the granular packet drop statistics and other operation information of the DDoS attack mitigation appliances to the administrator. It is appreciated to a person skilled in the art that the statistics may be reported to the administrator directly by the DDoS attack mitigation appliance.

Components described above are meant only to exemplify various possibilities. In no way should the aforementioned exemplary computer system limit the scope of the present disclosure.

Although embodiments of the present invention and their various advantages have been described in detail, it should be understood that the present invention is not limited to or defined by what is shown or discussed herein.

Moreover, as one skilled in the art will appreciate, any digital computer systems can be configured or otherwise programmed to implement the methods and apparatuses disclosed herein, and to the extent that a particular digital computer system is configured to implement the methods and apparatuses of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

What is claimed is:

1. A method for mitigating distributed denial of service (DDoS) attacks, comprising:
   providing a distributed software defined networking (SDN) architectural solution to DDoS mitigation by decoupling a control plane and a data plane for DDoS attack mitigation, wherein functionality associated with the control plane is implemented within a DDoS attack mitigation central controller and includes adaptive, continuous estimation of behavioral thresholds based on past traffic and management of DDoS attack mitigation policies and wherein functionality associated with the data plane is implemented within and distributed among the plurality of DDoS mitigation appliances and includes collection of granular traffic rate information regarding traffic observed by each of the plurality of DDoS mitigation appliances;
   receiving, by a DDoS attack mitigation appliance of the plurality of DDoS attack mitigation appliances, the DDoS attack mitigation policies through a network connecting the DDoS attack mitigation central controller and the DDoS attack mitigation appliance; and
   mitigating a DDoS attack based on the received DDoS attack mitigation policies, wherein the DDoS attack mitigation policies are generated by the DDoS attack mitigation central controller based on granular behavioral packet rate thresholds estimated based on the granular traffic rate information collected at least from the DDoS attack mitigation appliance.

2. The method of claim 1, wherein the granular traffic rate information includes traffic rates observed during a predetermined period of time for a plurality of predetermined parameters of layer 2, layer 3, layer 4 or layer 7 of a network stack.

3. The method of claim 2, further comprising enforcing the received DDoS attack mitigation policies at layers 2, 3, 4 and 7 of the network stack.

4. The method of claim 1, further comprising:
   receiving, by the DDoS attack mitigation appliance, inbound and outbound packets; and
   performing behavioral DDoS attack mitigation by blocking packets that exceed granular behavioral thresholds or access control policies set by the received DDoS attack mitigation policies.

5. The method of claim 4, further comprising creating service protection profiles based on Internet Protocol (IP) subnets, Virtual Local Area Network (VLAN) tags or Media Access Control (MAC) addresses of a source or a destination of the packets.

6. The method of claim 4, further comprising:
   collecting, by the DDoS attack mitigation appliance, granular traffic rate information from traffic passing through it, and
   sending granular traffic rate information to the DDoS attack mitigation central controller.

7. The method of claim 6, further comprising tracking offending sources that exceed behavioral source packet rate thresholds or repetitively send packets that are caught within an identified behavioral granular parameter flood.

8. The method of claim 1, further comprising:
   collecting, by the DDoS attack mitigation appliance, granular packet drop statistics from traffic passing through it, and
   sending granular packet drop statistics to the DDoS attack mitigation central controller.

9. The method of claim 1, further comprising creating a secure communication by the DDoS attack mitigation appliance with the DDoS attack mitigation central controller.

10. A distributed denial of service (DDoS) attack mitigation appliance comprising:
    a non-transitory storage device having embodied therein instructions representing a security application; and
    one or more processors coupled to the non-transitory storage device and operable to execute the security application to perform a method comprising:
    receiving, by the DDoS attack mitigation appliance, DDoS attack mitigation policies through a network connecting a DDoS attack mitigation central controller and the DDoS attack mitigation appliance; and
    mitigating a DDoS attack based on the received DDoS attack mitigation policies, wherein the DDoS attack mitigation policies are generated by the DDoS attack mitigation central controller based on granular behavioral packet rate thresholds estimated based on granular traffic rate information collected from a plurality of DDoS attack mitigation appliances;

wherein the DDoS attach mitigation appliance is one of the plurality of DDoS attack mitigation appliances and the DDoS mitigation central controller and the plurality of DDoS attack mitigation appliances provide a distributed software defined networking (SDN) architectural solution to DDoS mitigation by decoupling a control plane and a data plane for DDoS attack mitigation;

wherein functionality associated with the control plane is implemented within the DDoS attack mitigation central controller and includes adaptive, continuous estimation of behavioral thresholds based on past traffic and management of the DDoS attack mitigation policies; and wherein functionality associated with the data plane is implemented within and distributed among the plurality of DDoS mitigation appliances and includes collection of the granular traffic rate information.

11. The appliance of claim 10, wherein the granular traffic rate information includes traffic rates observed during a predetermined period of time for a plurality of predetermined parameters of layer 2, layer 3, layer 4 or layer 7 of a network stack.

12. The appliance of claim 11, wherein the method further comprises enforcing the received DDoS attack mitigation policies at layers 2, 3, 4 and 7 of a network stack.

13. The appliance of claim 10, wherein the method further comprises:
  receiving, by the DDoS attack mitigation appliance, inbound and outbound packets; and
  performing behavioral DDoS attack mitigation by blocking packets that exceed granular behavioral thresholds or access control policies set by the received DDoS attack mitigation policies.

14. The appliance of claim 13, wherein the method further comprises creating service protection profiles based on Internet Protocol (IP) subnets, Virtual Local Area Network (VLAN) tag or Media Access Control (MAC) addresses of source or destination of the packets.

15. The appliance of claim 10, wherein the method further comprises:
  collecting, by the DDoS attack mitigation appliance, the granular traffic rate information from traffic passing through it, and
  sending the granular traffic rate information to the DDoS attack mitigation central controller.

16. The appliance of claim 15, wherein the method further comprises tracking offending sources that exceed behavioral source packet rate thresholds or repetitively send packets which are caught within an identified behavioral granular parameter flood.

17. The appliance of claim 10, wherein the method further comprises:
  collecting, by the DDoS attack mitigation appliance, granular packet drop statistics from traffic passing through it, and
  sending granular packet drop statistics to the DDoS attack mitigation central controller.

18. The appliance of claim 10, wherein the method further comprises creating a secure communication by the DDoS attack mitigation appliance with the DDoS attack mitigation central controller.

* * * * *